United States Patent
Liang

(10) Patent No.: US 6,429,241 B1
(45) Date of Patent: Aug. 6, 2002

(54) ELASTOMER-MODIFIED BITUMINOUS COMPOSITIONS

(75) Inventor: Zhi-Zhong Liang, Richmond Hill (CA)

(73) Assignee: Polyphalt LLC, Tornto (CA)

( * ) Notice: Subject to any disclaimer, the term of this patent is extended or adjusted under 35 U.S.C. 154(b) by 0 days.

(21) Appl. No.: 09/402,320

(22) PCT Filed: Apr. 3, 1998

(86) PCT No.: PCT/CA98/00310

§ 371 (c)(1),
(2), (4) Date: Dec. 2, 1999

(87) PCT Pub. No.: WO98/45372

PCT Pub. Date: Oct. 15, 1998

Related U.S. Application Data

(60) Provisional application No. 60/042,937, filed on Apr. 4, 1997.

(51) Int. Cl.[7] .................................................. C08L 95/00
(52) U.S. Cl. ............................. 524/68; 524/59; 524/69; 524/70; 524/71
(58) Field of Search ............................ 524/59, 68, 69, 524/70, 71, 60, 61, 62

(56) References Cited

U.S. PATENT DOCUMENTS

| | | | | |
|---|---|---|---|---|
| 3,803,066 A | * | 4/1974 | Petrossi ....................... | 524/60 |
| 3,879,323 A | * | 4/1975 | Van Der Loos ................ | 524/70 |
| 3,963,659 A | * | 6/1976 | Binder et al. .................. | 524/70 |
| 4,145,322 A | * | 3/1979 | Maldonado et al. ........... | 524/68 |
| 4,154,710 A | * | 5/1979 | Maldonado et al. ........... | 524/71 |
| 4,242,246 A | | 12/1980 | Maldonado et al. ........... | 524/71 |
| 4,330,449 A | * | 5/1982 | Maldonado et al. ........... | 524/68 |
| 4,547,399 A | * | 10/1985 | Fujihara et al. ................ | 524/62 |
| 5,371,121 A | | 12/1994 | Bellomy et al. ............... | 524/68 |
| 5,508,112 A | * | 4/1996 | Planche et al. ................ | 524/68 |
| 5,618,862 A | * | 4/1997 | Germanaud et al. .......... | 524/68 |
| 5,672,642 A | * | 9/1997 | Gros ........................... | 524/68 |

FOREIGN PATENT DOCUMENTS

| | | |
|---|---|---|
| EP | 174795 | 3/1986 |
| GB | 460854 | 2/1937 |
| GB | 1330425 | 9/1973 |
| GB | 1548541 | 7/1979 |
| WO | WO 90/02776 | 3/1990 |
| WO | WO 95/28446 | 10/1995 |
| WO | WO 97/45488 | 12/1997 |

* cited by examiner

*Primary Examiner*—Peter Szekely
(74) *Attorney, Agent, or Firm*—Sim & McBurney

(57) ABSTRACT

Polymer modified bituminous compositions which are stable against phase separation are provided at greater levels of incorporation of elastomeric polymer having a conjugated diene structure, such as styrene-butadiene rubbers, and/or cross-linking agent, specifically sulfur, by incremental addition of elastomeric polymer and/or cross-linking agent into the bitumen at elevated temperatures of about 150° to about 220° C.

19 Claims, No Drawings

ELASTOMER-MODIFIED BITUMINOUS COMPOSITIONS

REFERENCE TO RELATED APPLICATIONS

This application is a national phase application under 35 U.S.C. 371 of PCT/CA98/00310 which claims the benefit of provisional application 60/042,937 filed Apr. 4, 1997.

FIELD OF INVENTION

The present invention is concerned with the preparation of bituminous compositions with high performance characteristics, particularly compositions containing bitumen and high molecular weight elastomer(s). The bituminous compositions provided herein have numerous commercial uses, including road paving, roofing, asphalt emulsions and crack fillers.

BACKGROUND TO THE INVENTION

Bituminous compositions for various applications are known to contain elastomers, such as natural rubber (NR), styrene-butadiene rubber latex (SBR), Neoprene latex and styrene-butadiene block copolymers (SB). The SB copolymers having a conjugated diene structure are most commonly used to provide improved properties in specific applications. These elastomers improve the mechanical properties of the bitumen and hence their incorporation is desirable.

In general, low molecular weight (MW) elastomers, those having a MW of less than about 70,000, are readily dispersed in bitumen to form a compatible bitumen composition. In this specification, the term 'molecular weight' as applied to elastomeric polymers refers to their weight average molecular weight. However, low MW elastomers do not offer significantly improved properties when compared with those resulting from the use of high molecular weight elastomers as bitumen modifiers, unless the low MW rubber chains are expanded and strengthened using a cross-linking agent, such as elemental sulfur. Even when so cross-linked, the low MW elastomeric bituminous compositions are still inferior to those prepared from high molecular weight elastomers, those having a MW greater than MW about 200,000. Unfortunately, compositions prepared from the high MW elastomers, in most cases, give rise to compatibility problems for the elastomer in the bitumen, resulting in phase separation when the bituminous compositions are stored.

The prior art has disclosed that the compatability as well as the properties of high MW elastomer-modified compositions can be improved by in-situ vulcanization using sulfur as a cross-linking agent. However, the processes described in. the prior art result in severe limitations on the proportions of sulfur and/or elastomer which can be reacted in the bitumen before the composition forms an un-processable gel. As noted above, a vulcanization reagent, such as elemental sulfur in combination with elastomers, is frequently employed to enhance the properties or to improve the compatibility of the elastomer in modified bitumen.

Specific examples of such prior art include U.S. Pat. No. 4,154,710, U.S. Pat. No. 4,145,322, U.S. Pat. No. 4,242,246 and U.S. Pat. No. 5,371,121, EP 2023, BE 877 112, AU 59,875, WO 90/02776, GB 460854, GB 1 548 541 and GB 1 330 425. In each of these prior art patent publications, elemental sulfur was used to improve the performance and/or the compatibility of the elastomer-bitumen compositions. In other prior art patent publications, other types of reagents, such as sulfur-donors and peroxides, are disclosed. However, these additives are so expensive that they have not, in general, been used commercially.

In general, superior performance enhancement of bituminous compositions at a fixed loading of elastomer can be achieved by using higher molecular weight elastomers. However with these higher MW elastomers, poor storage stability and relatively high viscosity can result in difficult material handling (processing, pumping, polymer separation and reblending), even at high temperatures. A number of examples from the prior art teach that successful stabilization and property enhancement can be achieved in bitumen/styrene-butadiene/sulfur blends using relatively low molecular weight elastomers, normally well below about 150,000. Some examples, including those used in U.S. Pat. No. 4,154,710, have even been based on the use of very low molecular weight liquid rubber, to initiate the sulfur reaction, thereby forming a high molecular weight elastomeric network in-situ through vulcanization, avoiding both storage and processing problems. However, these compositions show sub-optimal performance, high cost or both.

Some other examples from the prior art (EPA 0174795) have used high MW elastomers (over about 150,000) which have reacted with sulfur to provide blends with good mechanical properties. However, such prior art examples have all suggested that sulfur-initiated reaction or vulcanization of a high molecular weight elastomer be carried out in bitumen/oil blends (that is, the bitumen is fluxed with a hydrocarbon oil). The reaction product may then be further diluted with a light fluxant oil to reduce the viscosity to prevent the formation by gellation of a highly viscous product. A similar prior art (BE 87712) discloses that the bitumen may be chemically modified by a mother solution in which a high molecular weight elastomer (SB di-block copolymer) and sulfur have been dissolved and pre-reacted into a light petroleum fluxant.

In a recent patent (U.S. Pat. No. 5,371,121), a process was disclosed for producing a stable bituminous composition without using light fluxant, and in which a high molecular weight (over about 150,000) tri-block thermoplastic elastomer was reacted with a defined amount of sulfur from 0.015% to 0.075% by wt. However, this disclosure is relevant to only one specific grade of bituminous asphalt cement (AC20R) and at relatively low sulfur loadings. At only slightly higher sulfur loadings of 0.1 and 0.25%, as disclosed in Examples 15 and 16 of the patent, gel formation resulted in viscosities exceeding the standard for AC20R. The process of the present invention overcomes these difficulties.

Most recent prior art (WO 97/45488) disclosed a new bitumen-polymer blend that utilizes a combination of two types of elastomers (SB di-block copolymer with 100,000 MW and SBS tri-block copolymer with 300,000 MW) at effective amounts and ratios, along with defined amounts of sulfur which is to be added and reacted into the asphalt to enhance performance. The remainder of the prior art refers only to the use of a single elastomer to be reacted in the system. However, all examples given in WO 97/45488 are limited to sulfur loading which do not exceed 4% by wt, based on the total amount of elastomers, otherwise the viscosity is too high to permit workability of the asphalt-polymer mix.

In principle, under reactive process conditions, especially those using a cross-linking agent, such as sulfur, increasing the quantity of high MW elastomer-incorporated into bitumen should require an equivalent relative increase in the quantity of sulfur, in order to achieve better stability of the dispersed elastomer, and acceptable mechanical properties of the product which is processable in varied industrial applications. However, to achieve this result represents a challenging combination of requirements. In practice, as disclosed above in the prior art on the practice of reactive processing of bituminous compositions, the skilled artisan tends to proceed with considerable caution when utilizing high molecular weight elastomers which are to be chemically vulcanized into bitumen alone or in combination with oil or fluxing agents. Usually, even at a fixed level of sulfur, as the concentration of the elastomer is increased, the viscosity of the asphalt mixture increases rapidly due to gellation and phase separation of the asphalt and elastomer may occur because of excessive inter-polymer cross-linking. Therefore, it is generally considered difficult to incorporate high MW elastomer into bitumen at higher loadings, especially for the situation in which the proportion of sulfur is also increased proportional to the increased load of elastomer. In addition, the limitation on the load level of elastomer which can be vulcanized into asphalt has restricted the application of the reactive process in important industrial applications, such as roofing, crack filler and so on.

The present invention is directed towards solving the above described problems whereby a sulfur reactive process is proposed for producing unsaturated elastomer/bitumen compositions with high loadings of high MW elastomers and corresponding high loadings of sulfur. More particularly, the present invention is directed towards the provision of a novel process of preparing stable, high performance elastomer-bitumen compositions, which can be applied in many fields of industrial application. The compositions consist of the high MW elastomers (over about 150,000) which has been reacted into bitumen using sulfur as a cross-linking agent, resulting in a high performance product at desirable high loadings of sulfur and elastomer, generally from about 2% to about 30% by wt of sulfur, depending on the total amount of elastomer contained in the compositions.

SUMMARY OF INVENTION

The present invention relates to the preparation under reactive process conditions of stable bituminous compositions modified with high MW elastomers using sulfur or other cross-linking agent as a reagent, to provide compositions with superior performance. More particularly, the present invention is concerned with elastomer reacted bituminous compositions, in which high MW elastomers having molecular weight of over about 150,000 and with a conjugated diene structure have been well reacted through the agency of sulfur or other cross-linking agent, into bitumen, resulting in high performance products at desirable load levels of sulfur and/or elastomer.

In accordance with the invention, the elastomer with a conjugated diene structure can be a butadiene based homopolymer or random or block (di- or tri-) co-polymer or an isoprene based homo or co-polymer. Elemental sulfur is selected as the preferred cross-linking agent due to economics and availability, whereby it is used as a reaction reagent, to effectively in-situ vulcanize the elastomer into bitumen under defined procedures disclosed herein to achieve stable bituminous compositions with a good performance/cost balance, which may be applied over a broader range of applications. Other cross-linking agents, such as sulfur donors and peroxides, may be employed.

According to the present invention, these result are achieved by employing a defined procedure, in which the addition and mixing of the elastomer and/or sulfur are staged/programmed by controlling the timing and amount of incremental addition of sulfur and/or elastomer to achieve in-situ vulcanization of the elastomer into bitumen under agitation at elevated temperature. The time- and mass-controlled addition of elastomer and/or sulfur may also be achieved continuously within an equivalent period of time using the principle of the invention.

Accordingly, in one aspect of the present invention, there is provided a method of forming a bituminous composition, which comprises dispersing by blending and reacting an elastomeric polymer having a conjugated diene structure and a molecular weight of about 45,000 to about 750,000 with bitumen and a cross-linking agent at a temperature of about 150° C. to about 220° C. to stably incorporate the elastomeric polymer into the bitumen against phase separation according to ASTM D5B92, wherein at least one of the elastomeric polymer and cross-linking agent is added incrementally to the bitumen (or equivalently continuously) and reacted to permit greater amounts of elastomeric polymer and/or cross-linking agent to be incorporated into the bitumen.

As described in more detail below, the method aspect of the present invention is preferably carried out using one of three different embodiments to provide the bituminous compositions which are stable against phase separation. In the three embodiments, sulfur or other cross-linking agent, elastomeric polymer or both are added incrementally or equivalently over the same overall time period to the bitumen at the elevated temperature. The invention extends to bituminous compositions which are stable against phase separation and which are obtainable by the procedures described herein.

The advantages of the present invention include the ability to employ high molecular weight elastomers at relatively high load levels in a reaction process with better viscosity control to confer enhanced performance on the bituminous composition at relatively low cost towards diverse applications. Further, the procedure of the present invention enables the use of a wide range of bitumens, many of which cannot normally be compatibilized with the elastomers, especially when their molecular weight is high/ or the load level is high.

GENERAL DESCRIPTION OF INVENTION

The term "bitumen" used herein means a class of black or dark-colored (solid, semi-solid or viscous) cementitious substances, natural or manufactured, composed principally of high molecular weight hydrocarbons of which asphalts, tars, pitches and asphaltites are typical. The term "asphalt" used herein means a dark, brown to black, cementitious material, solid or semi-solid in consistency, in which the predominating constituents are bitumens that occur in nature, as such, or are obtained as residue in petroleum refining.

The bitumens which may be used in the present invention vary widely in softening point, generally from about 20° to 65° C., preferably about 25° to 55° C. The bitumen may comprise about 75 to a but 99 wt % of the total composition, preferably about 85 to about 98 wt % of the total composition.

The ability to use bitumens of widely varying properties is an advantage of the present invention. Normally only a narrow range of asphalts is suitable for phase stable incorporation of elastomers.

The elastomers which may be used in the present invention have a conjugated diene structure and may vary from elastomeric polymers to elastomeric copolymers or thermoplastic elastomers. The elastomeric polymers may be those conjugated diene polymers selected among butadiene, isoprene and their functionalized polymers, such as those with halogenated or carboxylated groups. The elastomeric copolymers are thermoplastic elastomers or are conjugated diene based copolymers with another type of polymer, such as styrene and isobutylene. The copolymers may be a random or a block; di-sequenced; multi-sequenced; or a statistical copolymer. Suitable elastomers include NR, SBR, SB and SBS. The potential for compatibilizing these high molecular weight elastomers of widely varying properties in bituminous compositions is another primary advantage of the present invention.

The elastomers which can be used include those having a molecular weight (MW) range from about 45,000 to about 750,000, preferably about 150,000 to about 450,000. These polymeric elastomers are available from a variety of commercial sources.

Such elastomers may be present in the bituminous compositions of the invention in an amount of about 1 to about 20 wt % of the total composition, preferably about 2 to about 12 wt %, depending on the end use to which the composition is put.

The quantity of sulfur which is employed in the process of the invention, generally varies from about 2 to about 30 wt %, preferably about 3 to about 15 wt %, more preferably about 5 to about 10 wt %, based on the total amount of elastomer contained in the composition.

The process of the present invention can be carried out in three different procedures as follows, any one of which may lead to different load level of elastomers, reacted/incorporated into bitumen at a desirable amount of sulfur. In Procedure A, the quantity of elastomer loaded is in a range from about 1% to about 8% by wt, preferably about 1.5% to about 5% by wt. All the elastomer needed for the final composition is added to bitumen and is well mixed/dispersed in the bitumen at a temperature generally in a range of about 150° C. to about 220° C., preferably from 170° C. to about 190° C. Then elemental sulfur is added to the mixture in increments with defined time intervals with sufficient agitation.

When the sulfur is added incrementally to the heated mixture of bitumen and elastomer, the shearing is maintained and predetermined weights of the sulfur are added with closely defined time intervals between each increment of sulfur addition. Generally about 2 to about 10 increments of sulfur addition are used over a total period of about 1 hr to about 12 hours, with about 0.5 to about 2 hours between each incremental loading. Alternatively, the mass flow rate of sulfur when added continuously may be determined within an equivalent period of time, based on these criteria.

The incremental load of sulfur in this procedure is from about 3% to 15% by wt, preferably about 5 to about 10 wt %, based on the total amount of elastomer.

Following Procedure A, the incremental loading of sulfur, with certain time intervals or over a defined period of time under agitation, leads to a high degree of interaction of the elastomer and the bitumen. As a result, a high degree of compatibilization of the high MW elastomer with bitumen is achieved while at the same time avoiding rapid increased viscosity extremes due to excessive inter-polymer cross-linking, that normally occurs in conventional procedures for loading sulfur into compositions similar to those with which the present invention is concerned.

In Procedure A, the bitumen preferably has a softening point as determined by ASTM D36 of about 25° to about 55° C. The compositions which are produced following procedure A preferably have a softening point, as determined by ASTM D36, of about 50° to about 100° C.

In Procedure B, all the sulfur needed for the final composition is added at one time in the conventional manner after some (a defined percentage) of the total elastomer has been first loaded and well dispersed into the bitumen. The amount of elastomer added in the first load is important. The quantity of the first load of elastomer is controlled within a range from about 20% to about 60% by wt of the total amount of elastomer, which is from about 2% to about 12% by wt, preferably from about 3 to about 7.5% by wt, in the final composition.

The amount of sulfur employed is about 10 to about 25 wt % of the initial loading of elastomeric polymer and the total amount of sulfur is about 3 to about 15 wt %, preferably about 5 to about 10 wt %, of the total amount of elastomeric polymer. The mixture is reacted at a temperature of about 150° to about 220° C., preferably about 170° to about 190° C., from about 5 to about 60 minutes.

Then, the remaining amount of elastomeric polymer is added all one time or incrementally to the elastomer reacted bitumen in about 1 to about 5 increments over a period of about 0.5 to about 12 hours with about 1 to about 2 hours between each incremental loading. Equivalently, the remainder of the elastomeric polymer may be added continuously over the period of incremental addition of the remainder of the elastomeric polymer.

The pre-dispersed elastomer from the first load should have quickly reacted with the bitumen in the presence of the excess of sulfur without gellation and effectively provides an elastomer reacted bitumen binder matrix, which is Theologically much more closely matched to facilitate the dispersion of the remaining elastomer to be loaded later. The residue of unreacted sulfur in the matrix readily reacts in an effective manner with the dispersed phase of elastomer added subsequently, ensuring the stabilization of elastomer reacted bituminous compositions.

The bitumen employed in Procedure B preferably has a softening point as determined by ASTM D36 of about 25° to about 55° C. The stable bituminous composition using Procedure B should preferably have a softening point as determined by ASTM D36 of about 50° to about 110° C.

The compositions prepared according to procedure B have a high MW elastomer chemically incorporated into bitumen at relatively high load levels of elastomer and/or sulfur, while still maintaining good workability (relatively low viscosity) of the product.

In Procedure C, both elastomer and sulfur are added incrementally and simultaneous or sequentially with sufficient agitation and at the same processing temperature as disclosed above under Procedures A and B. In principle, this procedure has combined Procedures A and B in a way that leads to a higher loading of elastomer in the bituminous compositions, which are stable and processable, and have a good cost/performance balance.

Following this reactive procedure, the elastomer may be loaded to levels of up to about 15% by wt, preferably up to about 12% by wt, which are suitable for those industrial applications which require high loading of polymeric modifier to meet specific engineering performance criteria. The quantity of sulfur which is employed in this procedure is in the range from about 2% to about 20% by wt, preferably from about 3 to about 10% by wt.

In this procedure C, each component may be added in about 2 to about 5 increments over a period of about 0.5 to about 12 hours with about 20 mins to about 2 hours between increments. Equivalently, the elastomeric polymer and/or sulfur may be added continuously over the period of incremental addition of the elastomeric polymer and/or sulfur.

The bitumen employed in procedure C preferably has a softening point, as determined by ASTM D36, of about 25° to about 55° C. The compositions prepared according to procedure C preferably have a softening point as determined by ASTM D36 of about 55° to about 130° C.

These procedures described above enable the production of highly compatible (stable) rubberized bituminous compositions, which may be further processed, and which have a viscosity in a workable range for paving, roofing or other bitumen-related industrial applications. The viscosity of the composition generally vary from about 200 to about 12,000, preferably about 1000 to about 6000 centipoise. The viscosity for composition intended for paving application generally is determined at 135° C. according to ASTM D4402 while the viscosity of composition intended for roofing application is determined at 180° C. according to ASTM D4402.

As noted earlier, the procedure permits a high loading of a high molecular weight elastomer without causing gellation problems and offers enhanced performance which can be achieved at a relatively low loading in comparison with those of the prior art.

The rubberized bitumen compositions obtained by the procedures of the invention may be diluted with the same or other bitumen to provide the desired composition for the specific contemplated end use. The rubberized bitumen products, in either concentrated or diluted form, may be mixed with additional identical or chemically similar elastomers to form a uniform mixture.

In addition, the diluted rubberized bitumen products according to the present invention may be further reacted with sulphur or other conventional cross-linking agent under low shear agitation to optimize the performance of the product.

EXAMPLES

Example A

This Examples describes the results of a first set of experiments using bitumen AC-20-1 from AASTO Materials Reference Laboratory (Grade: AC-20, MRL asphalt code: ABF).

In this first set of experiments, the elastomer used was a styrene-butadiene-styrene tri-block copolymer (SBS), a commercially-available thermoplastic elastomer with the trade-name Enichem-161B. The elastomer has an average molecular weight of 278,300 and a styrene/butadiene ratio of 30:70.

In such experiments, the polymer and sulfur, when used, were dispersed into the bitumen with a high shear mixer (Brinkman Polytron Mixer) at a temperature of 180° C. Certain properties of the resulting compositions are listed, using ASTM Standard procedures.

The results obtained in this first set of experiments is shown in Table I below. There are four experiments reported in Table 1, labelled Control, Comparative Example 1, Comparative Example 2 and Inventive Example 1, following Procedure A described above.

Results for the Control Example in Table I indicated that the SBS used was not compatible with the bitumen. The blend did not show superior performance enhancement and tended to polymer separation during hot storage without agitation.

The following two. Comparative Examples (No. 1 and 2) illustrate the results of using a conventional blending procedure to carry out bitumen modification with SBS elastomer using sulfur as a reagent for the purpose of improving both performance and compatibility.

Comparative Example 1

In a one liter mixer, 97.5% by wt of the bitumen was heated to 180° C. 2.5% by wt of Enichem-161B thermoplastic elastomer, was then added and dispersed in the bitumen with the high shear mixer for one hour at a speed of about 2,500 rpm. Within one or two minutes, elemental sulfur was added slowly to the mixture, while still mixing, in the amount of 5% by wt based on the total amount of the elastomer dispersed in the bitumen and mixing was continued for a further 1.5 hours. After the mixing was stopped, the dispersion of the elastomer was unstable (phase separated) and a viscous polymer-rich layer was formed on the surface of the rubberized bituminous composition.

Comparative Example 2

The method of Comparative Example 1 was repeated but 10% by wt of elemental sulfur was added instead of 5% by wt of the sulfur based on the total amount of the elastomer dispersed in the bitumen. This substitution resulted in the formation of a very viscous jelly-like rubber binder within about 0.5 hour after addition of sulfur under the process conditions described in Comparative Example 1. Additional mixing for two hours under high shearing did not cause the formed rubber gel to disappear from the bituminous composition. The resulting composition had a very high viscosity due to gellation and could not be tested for properties.

Inventive Example 1

This Example illustrates an inventive step using procedure A as described above.

In a one liter mixer, 97.5% by wt of the same bitumen as used in the above Comparative Examples were heated to 180° C., 2.5% by wt of Enichem-161B thermoplastic elastomer were added and dispersed in the bitumen with the high shear mixer for one hour at a speed of about 2,500 rpm. Sulfur then was added incrementally to the heated mixture of bitumen and the elastomer while maintaining high shearing with a defined interval between each increment of sulfur addition. Three increments of sulfur addition were used over a total period of about 2.5 hours, with about 40 minutes between each incremental loading, in a total amount of 10% by wt of sulfur based on the total amount of the elastomer contained in the composition. The resulting composition was very homogeneous and showed a high degree of compatibility of the elastomer into the bitumen while at the same time no extreme viscosity or gel formation resulted using the reactive procedure described above. The results of the property tests are given in Table I below.

Example B

This Example describes the results of a second set of experiments using bitumen AC-20-2 from the Huntway Refinery, California, USA. This bitumen grade is a typical AC-20 grade from this region. In this second set of experiments, the elastomer employed was the same as that used in Example A.

The results obtained in this second set of experiments are shown in Table 2. There are eight experiments reported in Table 2, labelled Control, Comparative Example 1, Comparative Example 2, Inventive Example 2, Inventive Example 3, Inventive Example 4, Inventive Example 5 and Inventive Example 6.

The Control Example in Table II indicated that the SBS used was also incompatible with the bitumen (AC-20-2). Polymer separation can be seen in the Table.

The first two Comparative Examples (Sample Nos. 1 and 2) were prepared using the conventional procedure in attempts to produce homogeneous compositions of modified bitumen with SBS elastomer at load levels of 4% by wt using sulfur as a cross-linking agent at load levels of 2.5% by wt and 5% by wt respectively, based on the total amount of elastomer dispersed in final composition.

Comparative Example 1

In a one liter mixer, 95.9% by wt of bitumen was heated to 180° C. 4% by wt of Enichem-161B thermoplastic elastomer, was then added and dispersed in the bitumen with a high shear mixer for 1.5 hours at a speed of about 2,500 rpm. Within one minute, elemental sulfur was added slowly to the mixture, while still mixing, in the amount of 2.5% by wt based on the total amount of the elastomer dispersed in the bitumen, which was continuously mixed for 1.5 hours. After the mixing was stopped, the dispersion of the elastomer was unstable and a viscous polymer-rich layer was formed on the surface of the rubberized bituminous composition.

Comparative Example 2

The method of Comparative Example 1 was repeated but 5% by wt of elemental sulfur was added instead of 2.5% by wt of the sulfur based on the total amount of the elastomer (4% by wt) dispersed in the bitumen. This substitution resulted in a very viscous jelly-like rubbery binder within about 20 min after addition of sulfur under the process conditions described in the Comparative Example 1 above. Additional mixing became quite difficult because of the highly viscous mixture formed due to the significant gellation of the bituminous composition. As a result, no property tests could be performed on the sample.

The Inventive Examples that follow illustrate the inventive examples using Procedure A, Procedure B and Procedure C respectively, which have been described in the General Description of Invention. The stable compositions at different SBS elastomer load levels were produced based on these defined Procedures.

Inventive Example 2

This Example again illustrates the inventive process using procedure A to compatibilize the SBS into bitumen (AC-20-2), in this case at a 4 wt % loading level.

In a one liter mixer, 95.8% by wt of the same bitumen as used in the above Comparative Examples were heated to 180° C., 4% by wt of Enichem-161B thermoplastic elastomer were added and dispersed in the bitumen with the Polytron Mixer for about one hour at a speed of about 2,500 rpm. Sulfur then was added incrementally to the heated mixture of bitumen and the elastomer while maintaining high shearing with a defined interval between each increment of sulfur addition. Three increments of sulfur addition were used over a total period of about 2.5 hours, with about 40 minutes between each incremental loading, to a total amount of 5% by wt of sulfur based on the total amount of the elastomer contained in the composition. The resulting composition appeared to be very homogeneous and to display a high degree of compatibility of the elastomer into the bitumen while at the same time no extreme viscosity or gel formation occurred during the above described reactive procedure. The results of property measurements are given in Table II.

Inventive Example 3

This Example illustrates an inventive example using Procedure B to compatibilize 4% by wt of the SBS into bitumen (AC-20-2).

In a one liter mixer, 95.8% by wt of the same bitumen as used in the above comparative example were heated to about 185° C., 2% by wt of Enichem-161B thermoplastic elastomer were added and dispersed in the bitumen with the Polytron Mixer for about one hour at a speed of about 2,500 rpm. The total amount of 10% by wt of sulfur based on the amount of the already dispersed elastomer in the composition then was added quickly within 1 or 2 minutes to the mixture with agitation. About 15 minutes after the sulfur was added, the remaining SBS (another 2% by wt) was added and dispersed with high shear for one and half-hours. The resulting composition also showed very homogeneous properties, and a high degree of storage stability as found in the sample with the same final composition prepared by the Procedure A. The results are given in Table II.

Inventive Example 4

This Example again illustrates an inventive example using Procedure B to compatibilize 6% by wt of the SBS into bitumen (AC-20-2).

In a one liter mixer, 93.8% by wt of the same bitumen as used in the above comparative example were heated to about 185° C., 2% by wt of Enichem-161B thermoplastic elastomer were added and dispersed in the bitumen with the Polytron Mixer for about one hour at a speed of about 2,500 rpm. The total amount of 10% by wt of sulfur based on the amount of elastomer already dispersed in the composition then was added quickly within 1 or 2 minutes to the mixture with agitation. About 15 min after sulfur was added, 2% more by wt of SBS was added and dispersed with high shear for about one hour. Additional SBS (the second 2% by wt) were added and dispersed with high shear for one and half-hours. The remaining SBS (the last 2% by wt) was added and dispersed into the mixture for about one hour. The resulting. composition also showed good storage stability as shown in Table II.

Inventive Example 5

This Example illustrates an inventive example using Procedure C to compatibilize 6% by wt of the SBS into bitumen (AC-20-2).

In a one liter mixer, 93.7% by wt of the same bitumen as used in the above Comparative Examples were heated to about 185° C., 2% by wt of Enichem-161B thermoplastic elastomer were added and dispersed in the bitumen with the Polytron Mixer for about one hour at a speed of about 2,500 rpm. Then, 10% by wt of sulfur based on the amount of the already dispersed elastomer in the composition was added quickly within 1 or 2 minutes to the mixture with agitation. About 15 minutes after the sulfur was added, 2% more by wt of SBS was added and dispersed with high shear for about one hour. Additional SBS (the second 2% by wt) was added and dispersed with high shear for one and half-hours. The remaining SBS (the last 2% by wt) was added and dispersed into the mixture for about 45 min, followed by the addition of about 1.7% by wt of sulfur based on the total amount of the elastomer in the final composition. Additional mixing for two hours resulted in a SBS modified bitumen composition with relatively better properties with respect to the Example 4 having the same SBS load level. The resulting composition showed good storage stability and performance as shown in Table II.

Inventive Example 6

This Example illustrates again an inventive example using Procedure C but to compatibilize 8% by wt of the SBS into bitumen (AC-20-2).

In a one liter mixer, 91.6% by wt. of the same bitumen as used in the above Comparative Examples were heated to about 185° C., 2% by wt of Enichem-161B thermoplastic elastomer was added and dispersed in the bitumen with the Polytron Mixer for about one hour at a speed of about 2,500 rpm. The 15% by wt of sulfur based on the amount of the already dispersed elastomer in the composition was then added quickly within 1 or 2 minutes to the mixture with agitation. About 15 min after the sulfur was added, 4% more by wt of SBS were added and dispersed with high shear for about one hour. The remaining sulfur was added in two increments with about 30-min time intervals to the mixer. The remaining SBS (the last 2% by wt) was added and dispersed into the mixture for about two hours. The resulting composition showed good storage stability and good mechanical performance as shown in Table II.

SUMMARY OF DISCLOSURE

In summary of this disclosure, a unique reactive process of preparing rubberized bitumen products at high loadings of high molecular weight elastomers, such as styrene-butadiene block copolymers, is provided in which the elastomer is compatibilized into the bitumen by incremental loading techniques. Modifications are possible within the scope of this invention.

TABLE I

| Examples | Control | Comparative 1 | Comparative 2 | Inventive 1 |
| --- | --- | --- | --- | --- |
| Blending Procedure | Conventional | Conventional | Conventional | Procedure A |
| Composition | | | | |
| Bitumen AC-20-1, % by wt | 97.5 | 97.375 | 97.25 | 97.25 |
| SBS, % by wt | 2.5 | 2.5 | 2.5 | 2.5 |
| Sulfur, % by wt | 0 | 0.125 | 0.25 | 0.25 |
| Sulfur/Elastomer ratio | — | 1/20 | 1/10 | 1/10 |
| Properties and Test Method | | | | |
| Softening point, C, ASTM D36 | 55 | 86 | — | 61 |
| Viscosity, cp at 135° C., ASTM D4402 | 758 | 1080 | — | 1340 |
| Viscosity, cp at 180° C., ASTM D4402 | — | — | — | — |
| Polymer Separation, ASTM D5892 | | | | |
| Softening point, C at top, ASTM D36 | 98 | 75 | — | 59 |
| Softening point, C at bottom, ASTM D36 | 52 | 55 | — | 59 |
| Storage Stability, ASTM D5892 | no | no | gellation | yes |

TABLE II

| Examples | Control | Comparative 1 | Comparative 2 | Inventive 2 | Inventive 3 | Inventive 4 | Inventive 5 | Inventive 6 |
| --- | --- | --- | --- | --- | --- | --- | --- | --- |
| Blending Procedure | Conventional | Conventional | Conventional | Procedure A | Procedure B | Procedure B | Procedure C | Procedure C |
| Composition | | | | | | | | |
| AC-20, % by wt (AC-20-2) | 96 | 95.9 | 95.8 | 95.8 | 95.8 | 93.8 | 93.7 | 91.6 |
| SBS, % by wt | 4 | 4 | 4 | 4 | 4 | 6 | 6 | 8 |
| Sulfur, % by wt | 0 | 0.1 | 0.2 | 0.2 | 0.2 | 0.2 | 0.3 | 0.4 |
| Sulfur/Elastomer ratio | — | 1/40 | 1/20 | 1/20 | 1/20 | 1/40 | 1/20 | 1/20 |
| Properties and Test Method | | | | | | | | |
| Softening point, C, ASTM D36 | 83 | 86 | — | 95 | 85 | 91 | 100 | 112 |
| Viscosity, cp at 135° C., ASTM D4402 | 1050 | 1780 | — | 3000 | 2135 | — | — | — |
| Viscosity, cp at 180° C., ASTM D4402 | 253 | 345 | — | 565 | 413 | 1042 | 1505 | 11775 |
| Polymer Separation, ASTM D5891 | | | | | | | | |
| Softening point, C at top, ASTM D36 | 112 | 102 | — | 92 | 83 | 92 | 100 | 127 |
| Softening point, C at bottom, ASTM D36 | 52 | 63 | — | 92 | 82 | 94 | 101 | 125 |
| Storage Stability, ASTM D5892 | no | no | gellation | yes | Yes | Yes | Yes | Yes |

What is claimed is:

1. A method of forming a bituminous composition consisting essentially of bitumen, elastomeric polymer and sulfur, said method consisting essentially of dispersing by blending and reacting an elastomeric polymer having a conjugated diene structure and a weight average molecular weight of about 45,000 to about 750,000 with bitumen and a cross-linking agent at a temperature of about 150° C. to about 220° C. to stably incorporate the elastomeric polymer into the bitumen against phase separation according to ASTM D5892, wherein at least one of the elastomeric polymer and cross-linking agent is added incrementally to the bitumen and reacted to permit greater amounts of elastomeric polymer and/or cross-linking agent to the incorporated into the bitumen than otherwise is possible, and wherein:

(a) the total overall quantity of elastomeric polymer to be incorporated into the composition is initially added to and fully dispersed in the bitumen in an amount of about 1 to about 8 wt % of the total composition, and (b) sulfur, as the cross-linking agent, is added incrementally to a total amount of about 3 to about 15 wt % of elastomeric polymer with the sulfur being added in about 2 to about 10 increments over a total period of about 1 to about 12 hours with about 0.5 to about 2 hours between each incremental loading.

2. The method of claim 1 wherein the overall quantity of elastomeric polymer is in the range of about 1.5 to about 5 wt % of the overall composition, the total amount of sulfur is about 5 to about 10 wt %, the elastomeric polymer has a molecular weight of about 150,000 to about 450,000, the bitumen has a softening point as determined by ASTM D36 of about 25° to about 440° C., and the softening point as determined by ASTM D36 of the composition is from 50° to about 100° C.

3. A method of forming a bituminous composition consisting essentially of bitumen, elastomeric polymer and sulfur, said method consisting essentially of dispersing by blending and reacting an elastomeric polymer having a conjugated diene structure and a weight average molecular weight of about 45,000 to about 750,000 with bitumen and a cross-linking agent at a temperature of about 150° C. to about 220° C. to stably incorporate the elastomeric polymer into the bitumen against phase separation according to ASTM D5892, wherein at least one of the elastomeric polymer and cross-linking agent is added incrementally to the bitumen and reacted to permit greater amounts of elastomeric polymer and/or cross-linking agent to the incorporated into the bitumen than otherwise is possible, and wherein:

(a) an initial loading of elastomeric polymer to be incorporated into the composition is added to and fully dispersed in the bitumen and comprising about 20 to about 60 wt % of the total elastomeric polymer loading of about 2 to about 12 wt %, (b) the total overall quantity of sulfur, as the cross-linking agent, to be employed is added to and dispersed in the bitumen following said initial loading and dispersion of the proportion of the overall quantity of elastomeric polymer to be incorporated into the composition and the mixture reacted for about 5 to about 60 minutes, wherein the amount of sulfur employed is about 10 to about 25 wt % of the initial loading of elastomeric polymer, and (c) the remainder of the elastomeric polymer is incrementally loaded in about 1 to about 5 increments over a total period of about 0.5 to about 12 hours with about 1 to about 2 hours between each incremental loading.

4. The method of claim 3 wherein the overall quantity of elastomeric polymer is in the range of about 2 to about 7.5 wt %, the total amount of sulfur is about 5 to 10 wt % of the total amount of elastomeric polymer, the elastomeric polymer has a molecular weight of about 150,000 to about 450,000, the bitumen has a softening point of about 25° to about 55° C. and the composition has a softening point of about 50° to about 110° C. as determined by ASTM D36.

5. A method of forming a bituminous composition consisting essentially of bitumen, elastomeric polymer and sulfur, said method consisting essentially of dispersing by blending and reacting an elastomeric polymer having a conjugated diene structure and a weight average molecular weight of about 45,000 to about 750,000 with bitumen and a cross-linking agent at a temperature of about 150° C. to about 220° C. to stably incorporate the elastomeric polymer into the bitumen against phase separation according to ASTM D5892, wherein at least one of the elastomeric polymer and cross-linking agent is added incrementally to the bitumen and reacted to permit greater amounts of elastomeric polymer and/or cross-linking agent to the incorporated into the bitumen than otherwise is possible, and wherein:

both elastomeric polymer and sulfur, as the cross-linking agent, are loaded and dispersed incrementally, either simultaneously or sequentially, into the bitumen, to a total overall amount of elastomeric polymer of up to about 15 wt % of the composition and a total overall amount of sulfur of about 2 to about 20 wt % of the elastomeric polymer, each component being added in about 2 to about 5 increments over a period of about 0.5 to about 12 hours with about 20 mins to about 2 hours between increments.

6. The method of claim 5 wherein the total overall amount of elastomeric polymer is in the range of up to about 12 wt % of the composition, the elastomeric polymer has a molecular weight of about 150,000 to about 450,000, the overall amount of sulfur is about 3 to about 10 wt % of the amount of elastomeric polymer, the bitumen has a softening point of about 25° to about 55° C. as determined by ASTM D36 and the composition has a viscosity of about 55° to about 130° C. as determined by ASTM D36.

7. The method of claim 1, 2, 3, 4, 5, or 6 wherein said bitumen comprises from about 75 to about 99 wt % of the overall composition.

8. The method of claim 8 wherein said bitumen comprises from about 85 to about 98 wt % of the total composition.

9. The method of claim 2, 4 or 6 wherein the elastomeric polymer is at least one butadiene-based homo-polymer or random or block co-polymer.

10. The method of claim 2, 4 or 6 wherein the elastomeric polymer is at least one isoprene-based homo- or co-polymer.

11. The method of claim 9 wherein the butadiene-based polymer is styrene-butadiene-styrene (SBS) or styrene-butadiene (SB) or a blend thereof.

12. A bituminous composition stable against phase separation according to ASTM D5892, comprising about 1 to about 8 wt % of an elastomeric polymer having a conjugated diene structure and a molecular weight of about 45,000 to about 750,000, by cross-linking with sulfur in an amount of about 3 to about 15 wt % of elastomeric polymer and having a workable viscosity, obtainable by the method of claim 1.

13. The bituminous composition of claim 12 wherein the amount of elastomeric polymer is about 1.5 to about 5 wt %, the amount of sulfur is about 5 to about 10 wt %, the elastomeric polymer has a molecular weight of about 150,000 to about 450,000, the bitumen has a softening point as determined by ASTM D36 of about 25° to about 55° C., and the composition has a softening point as determined by ASTM 36 of about 50° to about 100° C.

14. A bituminous composition stable against phase separation according to ASTM D5892, comprising about 2 to about 12 wt % of an elastomeric polymer having a conjugated diene structure and a molecular weight of about 45,000 to about 750,000, by cross-linking with sulfur in an amount of about 3 to about 15 wt % of the elastomeric polymer, and having a workable viscosity, obtainable by the method of claim 3.

15. The bituminous composition of claim 14 wherein the amount of elastomeric polymer is about 2 to about 7.5 wt % of the composition, the amount of sulfur is about 5 to about 10 wt % of the elastomeric polymer, the elastomeric polymer has a molecular weight of about 150,000 to about 450,000, the bitumen has a softening point as determined by ASTM D36 of about 25° to about 55° C. and the composition has a softening point as determined by ASTM D36 of about 50° to about 110° C.

16. A bituminous composition stable against phase separation according to ASTM D5892, comprising up to about 15 wt % of an elastomeric polymer having a conjugated diene structure and a molecular weight of about 45,000 to about 750,000, by cross-linking with sulfur in an amount of about 3 to about 15 wt % of the elastomeric polymer, obtainable by the method of claim 5.

17. The bituminous composition of claim 16 wherein the amount of elastomeric polymer is up to about 12 wt %, the amount of sulfur is about 3 to about 10 wt % of the elastomeric polymer, the elastomeric polymer has a molecular weight of about 150,000 to about 450,000, the bitumen has a softening point as determined by ASTM D36 of about 25° to about 55° C. and the composition has a softening point as determined by ASTM D36 of about 55° to about 130° C.

18. The composition claimed in claim 12, 13, 14, 15, 16 or 17 wherein said bitumen comprises at least about 85% by wt of said composition.

19. The composition as claimed in claim 18 wherein said elastomeric polymer comprises at least one butadiene-based homo-polymer or random or block co-polymer, at least one isoprene-based homo- or co-polymer, or a blend of such elastomeric polymers.

* * * * *